S. J. MATTHEWS.
AUTOMATIC CLUTCH.
APPLICATION FILED SEPT. 30, 1915.
1,236,860.
Patented Aug. 14, 1917.
2 SHEETS—SHEET 1.
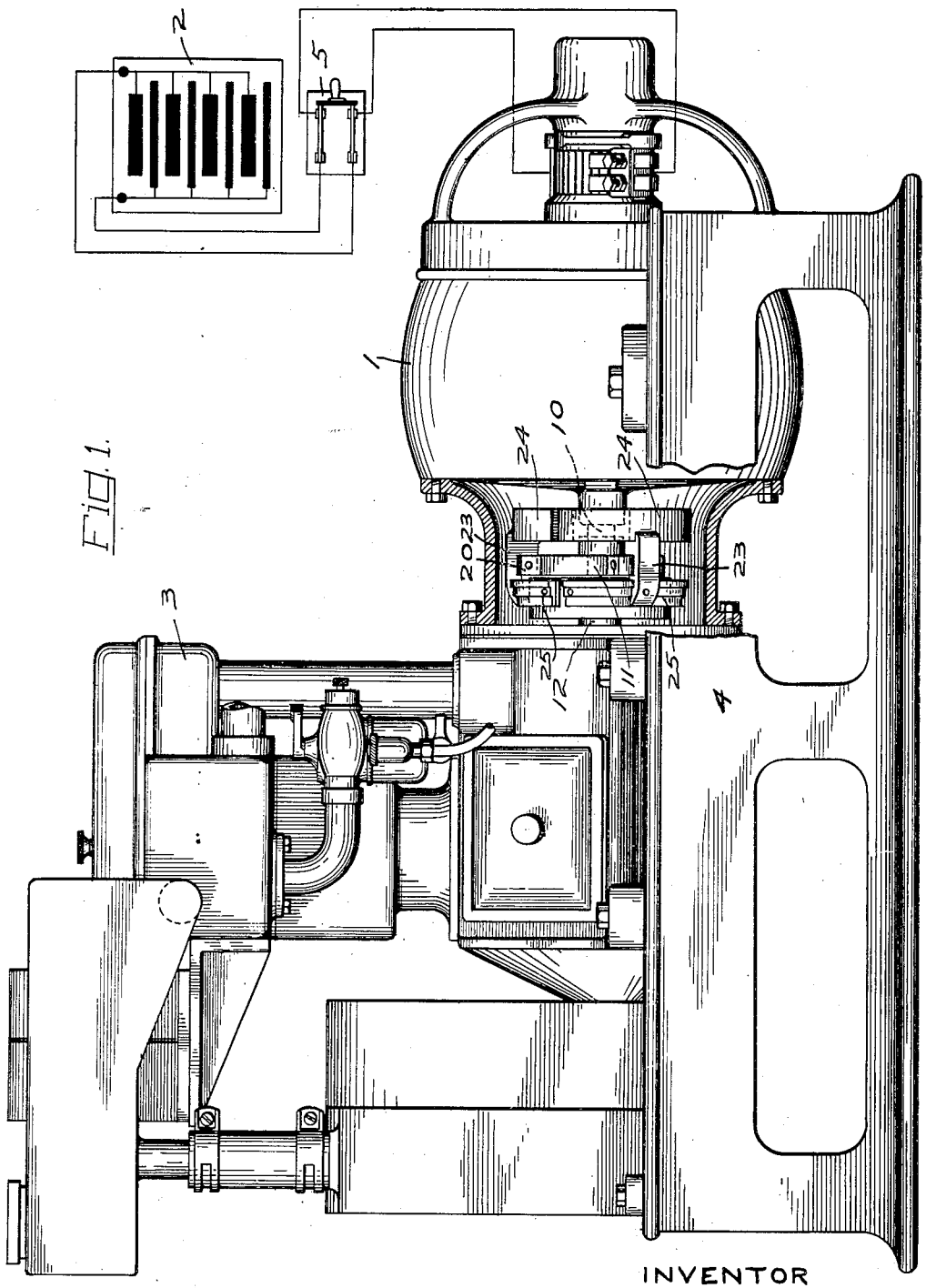
INVENTOR
Scott J. Matthews
by
Owen, Owen & Crampton S. J. MATTHEWS.
AUTOMATIC CLUTCH.
APPLICATION FILED SEPT. 30, 1915.
1,236,860.
Patented Aug. 14, 1917.
2 SHEETS—SHEET 2.
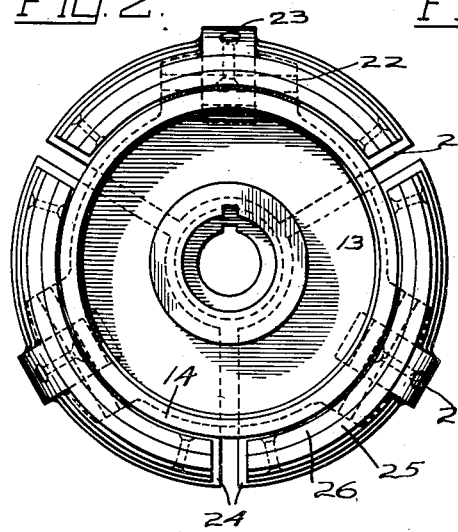
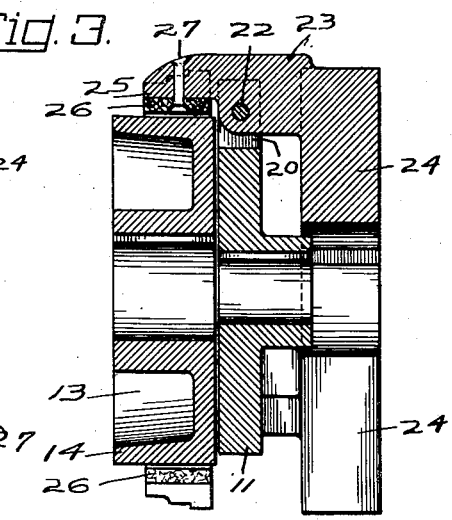
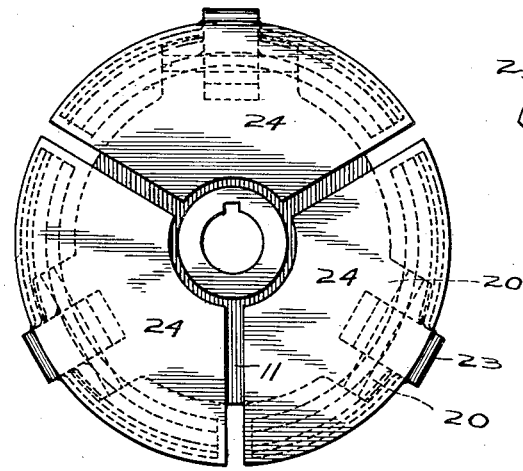
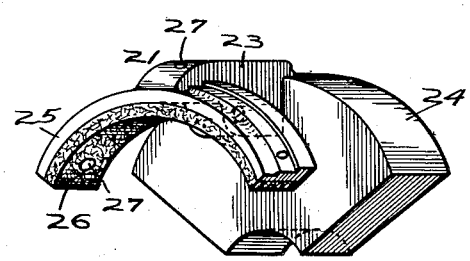
INVENTOR
Scott J. Matthews,
by
Owen, Owen & Crampton.

UNITED STATES PATENT OFFICE.

SCOTT J. MATTHEWS, OF PORT CLINTON, OHIO, ASSIGNOR TO THE MATTHEWS BOAT COMPANY, OF PORT CLINTON, OHIO, A CORPORATION OF OHIO.

AUTOMATIC CLUTCH.

1,236,860.     Specification of Letters Patent.     Patented Aug. 14, 1917.

Application filed September 30, 1915. Serial No. 53,408.

*To all whom it may concern:*

Be it known that I, SCOTT J. MATTHEWS, a citizen of the United States, and a resident of Port Clinton, in the county of Ottawa and State of Ohio, have invented a certain new and useful Automatic Clutch; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to automatic clutches. It particularly relates to a clutch which will operate only after the speed of rotation of the driving means reaches a certain point. The invention is particularly adapted for use in connection with electric motors where it is desirable to have the motor first acquire a certain speed to prevent burning out and to gradually turn the load on the motor.

Clutches embodying my invention are controlled by the centrifugal action of one or more members, which causes the clutch to connect the driving means with the driven means when the centrifugal force becomes sufficient to cause the clutch to move the driven means.

The invention may be contained in many forms of constructions usable for different purposes, all of which come within the purview of my claims hereinafter appended. To show the practicability of my invention I have selected one of such constructions as an example and shall describe it hereinafter. The construction selected is illustrated in the accompanying drawings.

Figure 1 of the drawings is a side view of the automatic clutch shown connected between an electric translating device, such as a motor, which may also operate as a generator and an internal combustion engine, the electric motor being used to start the engine. Fig. 2 is a front view of the clutch. Fig. 3 illustrates a section through the clutch on a plane through its axis. Fig. 4 is a rear view of the clutch, and Fig. 5 illustrates one of the clutch members.

1, Fig. 1, is an electric translating device, such as a motor, which may also be used as a generator for supplying current to an electric system, such as the storage battery 2. The translating device 1 may also be driven by the current from the storage battery 2 when operating as a motor. 3 is an internal combustion engine, which may be supported on the base 4 on which is also supported the translating device 1. The translating device 1 may be connected to the storage battery 2 through the switch 5.

The clutch mechanism is supported on the shaft of the translating device 1. The wheel or disk 11 is keyed to the shaft 10, while to the shaft 12 of the engine 3 is keyed a wheel 13 having the flange or rim 14. The shafts are in axial alinement, and the wheels are connected to the ends of their respective shafts and in juxtaposition.

The disk 11 may be provided with a plurality of ears or lugs 20. In the form of the invention shown, the disk or wheel 11 is provided on its periphery with three pairs of ears or lugs 20 which extend radially with respect to the wheel or disk 11. Clutch members 21 are pivoted between the ears 20 by means of the pivot pins 22, which extend through necks 23 that connect sector shaped weights 24 and clutch segments 25. The necks 23 may be formed integral with the sectors 24 and the clutch segments 25. To the inner surfaces of the segments 24 are secured strips of leather 26 to make an efficient gripping frictional surface. The leather strips are secured by pins 27. The sectors 24 extend inwardly toward and are arranged around the shaft 10 of the electric translating device 1.

When the translating device 1 is operated as a motor, the shaft 10 being keyed to the disk 11, the sectors 24 are rotated and swung outward on the pins 22 and when the shaft is given sufficient speed it will rotate the crank shaft 12 of the engine. The sector 24 will cause the segments 25 to clamp on the periphery of the wheel 13 and when the rate of rotation of the translating device 1 is sufficient it will cause the rotation of the shaft 11 to be communicated to the crank shaft 12 and consequently will cause the internal combustion engine to start in its operation provided the engine is in operative condition. The speed of the internal combustion engine when in operation being greater than that of the translating device when operating as a motor, it will cause the shaft 10 to rotate at a greater rate and consequently will cause an increased centrifugal action by the sectors 24, which will increase the pressure of the segments 25. This will increase the frictional engagement between the members of the clutch. The translating device 1 will then act as a generator to charge the storage battery 2.

This construction selected and described may be greatly varied in the arrangement and manufacture of its parts and in the substitution of elements having equivalent functions and such modifications may be used for many varied purposes and still contain the invention.

What I claim as new, and desire to secure by Letters Patent, is,—

1. In an automatic clutch the combination of a pair of rotatable members, a plurality of lever members pivoted to the periphery of one of said rotating members and extending longitudinally of its axis, each of said lever members having a segmental clutch part at one end for frictional co-action with the periphery of the other rotating member and having at its other end an inwardly projecting sector which is of greater area and weight than said segment and terminates at its inner edge adjacent to the axis of said rotating members.

2. In an automatic clutch, the combination of a pair of rotatable members having substantially the same diameter, a plurality of clutch members, each of the clutch members pivotally supported on one of the rotating members and having an engaging surface for engaging the periphery of the other of the rotating members and having a sector extending toward the axis of the other rotating member, the sectors substantially covering the area of the last named rotating member.

In testimony whereof, I have hereunto signed my name to this specification.

SCOTT J. MATTHEWS.